Sept. 4, 1945. O. E. ROSEN 2,384,196

HAND FEED CONTROL MEANS FOR DUPLICATING MACHINES

Filed Dec. 29, 1941

INVENTOR.
OSCAR E. ROSEN
BY Swan, Frye, & Hardesty
ATTORNEYS

Patented Sept. 4, 1945

2,384,196

UNITED STATES PATENT OFFICE 2,384,196

HAND-FEED CONTROL MEANS FOR DUPLICATING MACHINES

Oscar E. Rosen, Detroit, Mich.

Application December 29, 1941, Serial No. 424,730

2 Claims. (Cl. 90—13.5)

The present invention relates to duplicating machines and specifically to means for controlling the feed of the work to the cutter or vice versa.

In the operation of duplicating machines where the control of the cutting is done by means of a tracer contacting a pattern, it is usual to allow the tracer to control the movement of the tracer and cutter to and from the pattern and work, respectively, or the movement of the pattern to and from the tracer and cutter, respectively, while the movement of the work past the cutter, or vice versa, is accomplished by the usual automatic feed.

However, in many cases it is desirable to use hand feed while permitting the tracer to control the movement of the work and cutter relative to each other. In a specific example, the tracer may control the up and down movements of the cutter or work while the horizontal movement is accomplished by hand feed.

In such cases, it is difficult if not impossible, to so regulate the hand feed as to keep the tracer always in contact with the pattern, particularly on sloping surfaces. Accordingly, among the objects of the present invention is means by which this difficulty may be overcome.

Another object is means for limiting the speed of the hand feed in accordance with the angle of the cut—the steeper the angle, the slower the feed.

Another object is an automatic braking means on the hand operated feed element which means is tracer-controlled.

Figure 1:
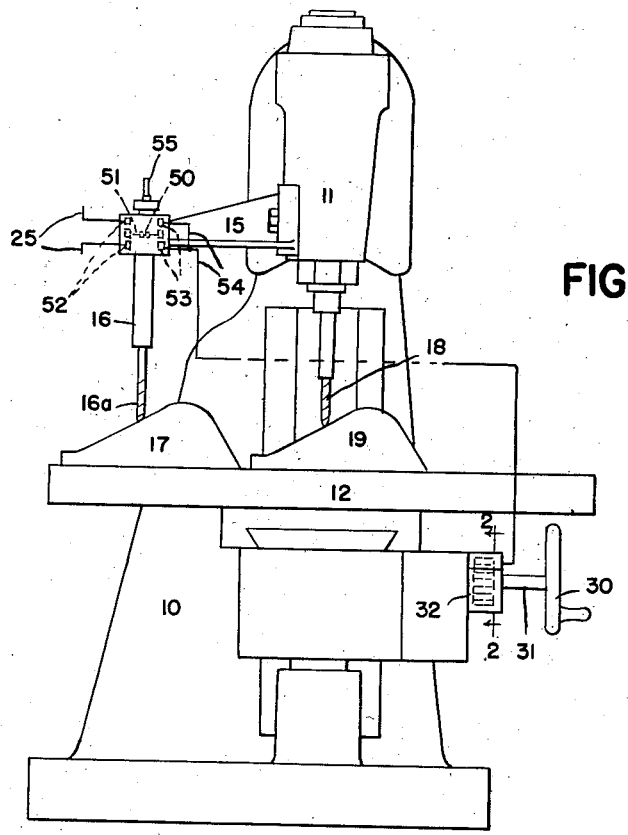

Still other objects will readily occur to those skilled in the art upon reference to the following description and the accompanying drawing in which Figure 1 is a conventional representation of a cutting machine with the brake attached.

Figure 2:
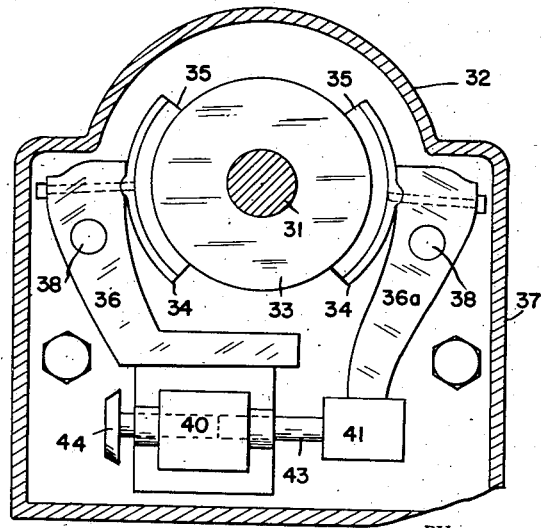

Figure 2 is a section on line 2—2 of Figure 1.

In the drawing, the conventional cutting machine is shown as consisting of a base and frame portion 10, a cutter head 11 movable vertically, and a work table 12 movable laterally and forward or backward. As shown, the cutter head has fixed thereto an arm 15 carrying a tracer 16, the movable finger of which is adjusted to contact a pattern 17 as the cutter 18 contacts the work 19.

As the pattern and work are moved laterally with the table 12 the cutter head 11 is moved up or down under control of the tracer by means and in the manner shown and described in United States Letters Patent No. 2,138,208, issued November 11, 1938, the operating means being connected electrically to the tracer through the wires 25.

When it is desired to operate the table 12 by hand, this is accomplished by rotation of the hand wheel 30. But since in such operation it is difficult to vary the speed of operation in exact accord with the angle of the cut, there is applied to the hand wheel shaft 31 the device shown in detail in Figure 2 and shown at 32 in Figure 1. This device consists of a brake drum 33 fixed to shaft 31 and acted upon by a pair of brake shoes 34 suitably lined as at 35 and pivotally attached to a pair of arms 36 and 36a, themselves pivoted upon the stationary housing 37, as at 38.

The lower free end of arm 36 has fixed thereto a solenoid 40, this being so arranged that its axis is in alignment with a suitable anvil or enlarged flat surfaced portion 41 at the free end of arm 36a.

At 44 is indicated a suitable T shaped core for solenoid 40 and at 43 is shown a non-magnetic extension of said core, this projecting from the solenoid and abutting the portion 41 of arm 36a. With such an arrangement, whenever the solenoid 40 is energized, the free ends of arms 36 and 36a will be pushed apart and the brake applied.

Current for energization of the solenoid 40 may be taken from the tracer 16, and the braking impulses produced whenever the tracer finger 16a is displaced. This arrangement, however, while practicable, is less desirable than a separate control of the brake device and the tracer shown in the drawing as modified to give such control.

The tracer construction, except in one particular, is shown in United States Letters Patent No. 2,162,491, issued June 13, 1939. It includes an arm oscillatable by means of a synchronous motor between two stationary contacts. This arm carries a live contact and is movable by the tracer finger 16a to complete a circuit through one or the other of the stationary contacts. One of these circuits causes the movement of the cutter head up and the other, down.

The point of construction constituting the exception mentioned is in the addition to the oscillating arm, of a cross arm carrying a live contact at each end and in adding two other stationary contacts both of which are connected to solenoid 40. All of said contacts may be made adjustable so that it is possible to actuate the brake simultaneously with the energizing of the other contacts or to cause a lag in brake actuation.

On Figure 1, the tracer 16 shows the head more or less diagrammatically and indicates the oscillating arm at 50 as carrying a cross arm 51 carrying contacts at each end adapted to complete circuits through the stationary contacts 52 at one end and 53 at the other end. The contacts 52 are connected through conductors 25 to the feed control as already mentioned while the contacts 53 are connected by conductors 54 to the solenoid 40, these conductors being connected together at or before reaching the solenoid.

Current supply to the tracer is through the conductor 55 and suitable returns to a ground will, of course, be provided for the drive unit and for solenoid 40.

The operation of the device is quite obvious. When the tracer finger 16a strikes a steep ascending portion of the pattern 17, the braking device 32 slows the feed so that the cutter is not overloaded. When the finger 16a comes to a steep descending portion, the feed is again slowed so that the tracer remains in contact with the pattern.

It is to be understood that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a duplicating cutting machine having a tracer including electric circuit making and breaking means adapted to control action of the cutter in one direction and including a rotatable member hand operated means for controlling action of the cutter in another direction, electrically actuated braking means including frictionally engageable and disengageable members constructed and arranged to create a drag on said rotatable member to thereby control the speed of rotation of the hand operated means, and additional circuit making and breaking means in said tracer for causing actuation of said electric speed control means.

2. In a duplicating cutting machine in which a pattern and a work piece are adapted to be moved with relation to a tracer and cutter and in which the action of said pattern upon said tracer controls the action in one direction of said cutter upon said work piece through the action of electric circuit making and breaking means in said tracer, means including a rotatable member for moving the cutter and work piece relatively in another direction, electrically actuated means including frictionally engageable and disengageable members constructed and arranged to create a drag on said rotatable member to thereby control the speed of the latter movement and circuit making and breaking means in said tracer for causing actuation of the last mentioned controlling means.

OSCAR E. ROSEN.